United States Patent [19]
Sutker

[11] Patent Number: 5,425,016
[45] Date of Patent: Jun. 13, 1995

[54] DIGITAL LASER ENCODER/RECORDER/PLAYER, UTILIZING ELLIPSOIDAL MEMORY MEDIUM

[76] Inventor: Hal Sutker, 1218 Sheridan Rd., Evanston, Ill. 60202

[21] Appl. No.: 202,563

[22] Filed: Feb. 28, 1994

[51] Int. Cl.⁶ .................................................. G11B 7/00
[52] U.S. Cl. .................................. 369/275.1; 369/100; 369/103; 369/283; 369/284
[58] Field of Search ..................... 369/275.1, 100, 283, 369/284, 286, 288, 103

[56] References Cited

U.S. PATENT DOCUMENTS

| | | | |
|---|---|---|---|
| 5,177,717 | 1/1993 | Sato et al. | 369/100 |
| 5,224,090 | 6/1993 | Umeda et al. | 369/284 |

Primary Examiner—Joseph A. Popek
Assistant Examiner—Huan Hoang
Attorney, Agent, or Firm—Paul H. Gallagher

[57] ABSTRACT

A rotatable memory medium having a memory surface of ellipsoid surface defining two foci. A laser beam is directed to one focus and then reflected to the memory surface, and from the latter to the other focus where a sensor is positioned. The memory surface has a memory track of spiral shape, and the laser beam reflected to the memory surface is so reflected by a T-mirror, and the source of the laser beam remains stationary. The ellipsoid memory surface assumes a plurality of different shapes, such as one-half of an ellipsis on one side of a plane containing both foci, or generated about either an internal axis or an external axis.

27 Claims, 3 Drawing Sheets

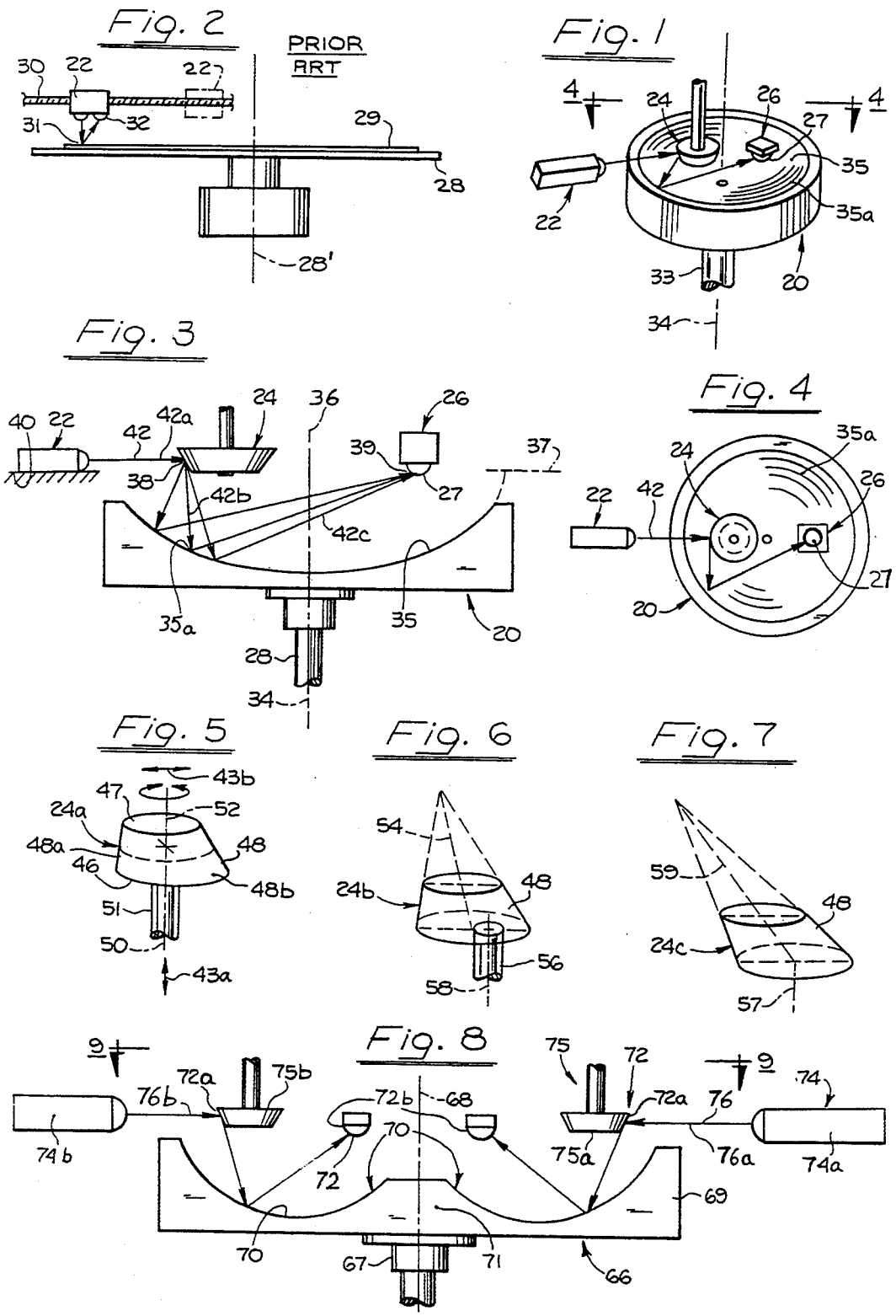

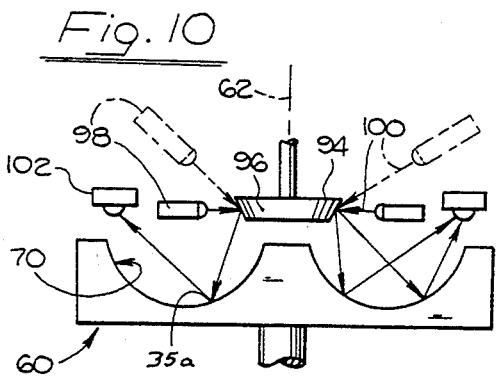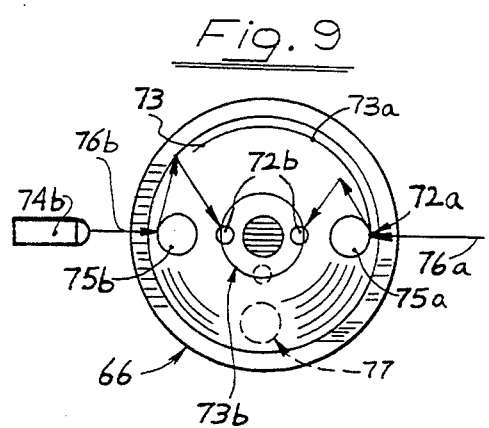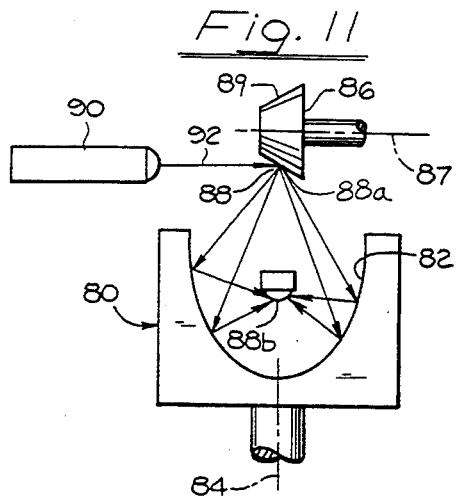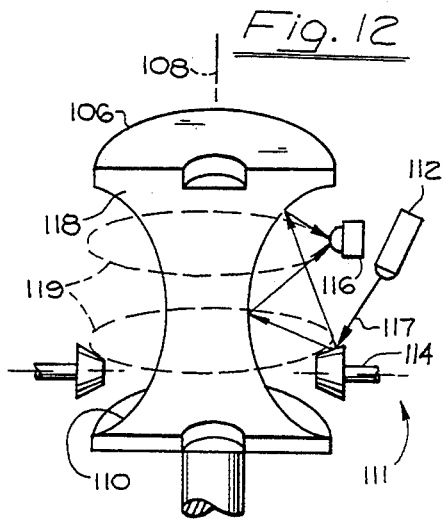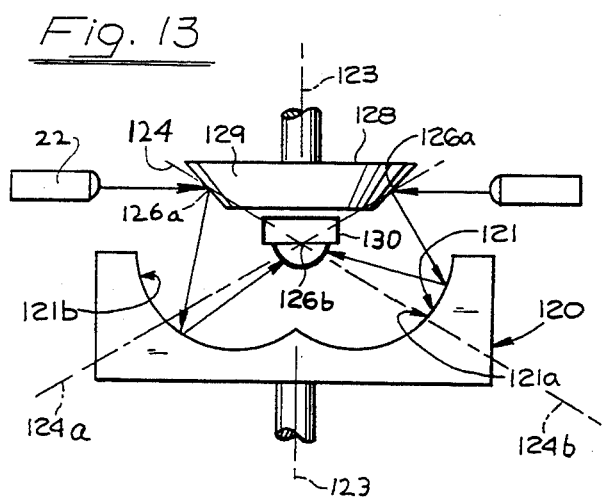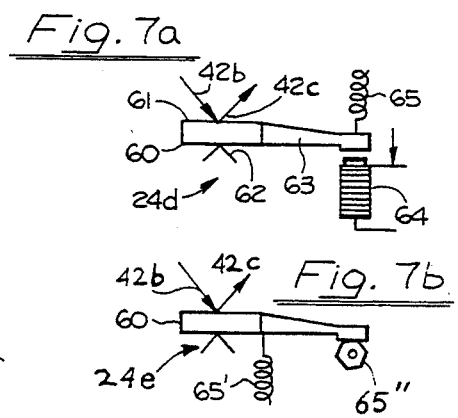

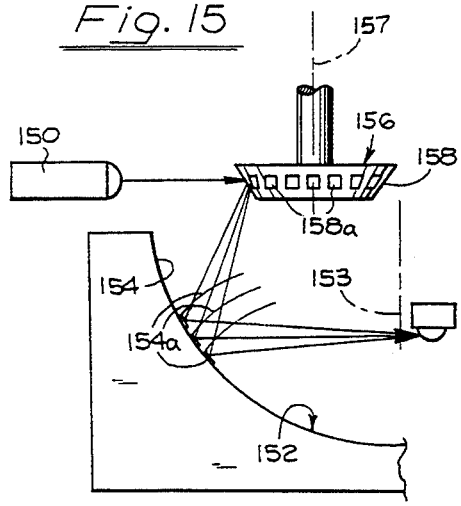
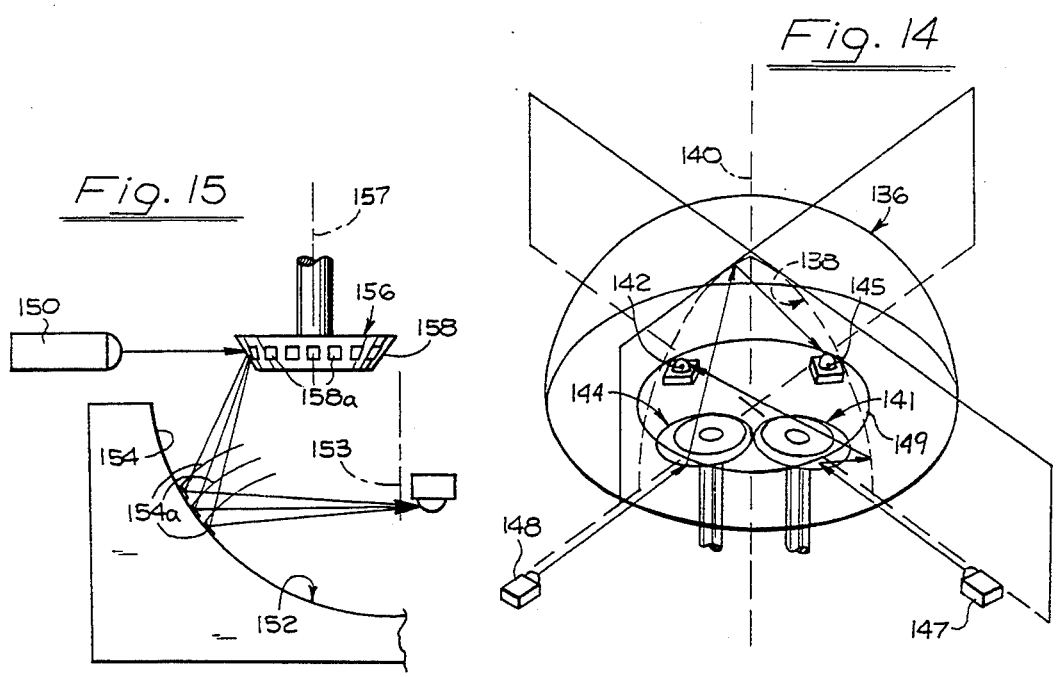
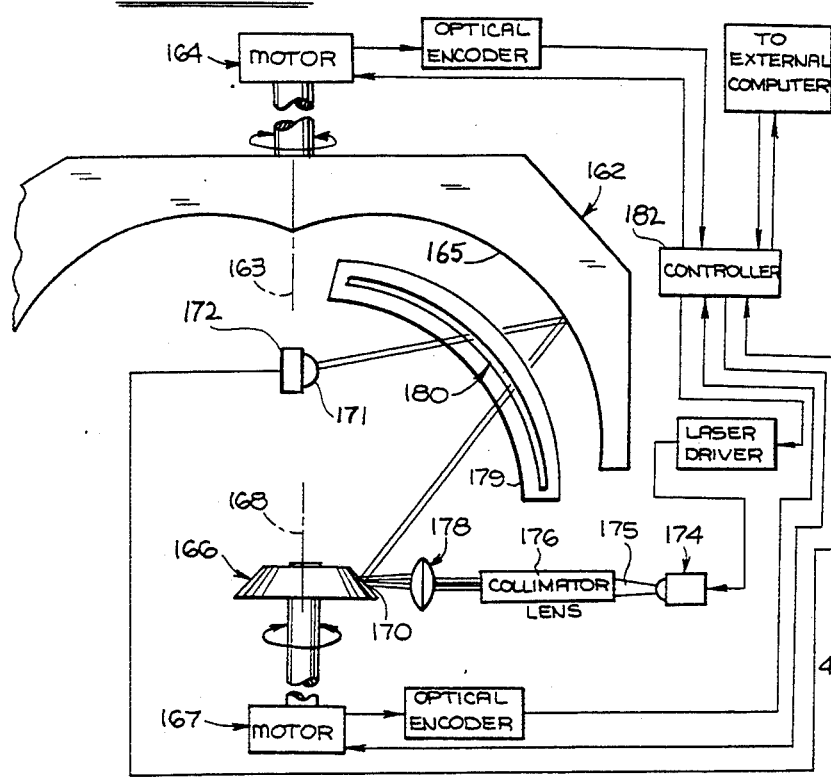
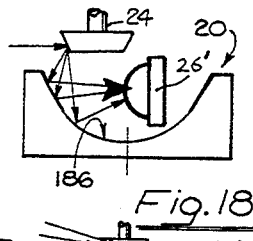
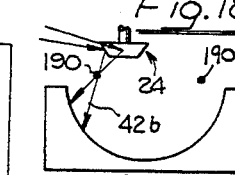
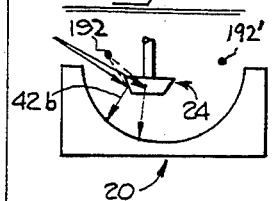

DIGITAL LASER ENCODER/RECORDER/PLAYER, UTILIZING ELLIPSOIDAL MEMORY MEDIUM

FIELD OF THE INVENTION

The invention resides in the general field of recording signals on a memory medium, and later retrieving those signals and converting or playing them. The device utilizes a laser beam, and includes a translation mirror, a memory mirror, and a sensor.

This general concept has been used before, in devices utilizing a memory medium in the form of a flat disc having a spiral shaped track. The laser beam source was mounted for projecting the laser beam onto the spiral track, and it was mechanically and bodily moved for correspondingly moving the laser beam along the track. Such an arrangement was cumbersome and extremely slow-acting.

The invention as disclosed herein is directed particularly to the audio field, but it is applicable to other fields as well, computer field, or control or encoding field.

A main and important object of the invention is to provide a new device or apparatus of the foregoing general character that is extremely fast-acting.

Another important object is to provide such a device in which the laser beam source is not moved bodily, but is stationarily mounted, and the laser beam is directed and shifted angularly while the source remains stationary.

A further and important feature and advantage of the invention is the utilization of an ellipsoidal shape memory medium forming two foci, and the laser beam is directed from one focus onto the reflecting surface, and then reflected to the other focus, whereby to provide fine control of the laser beam in utilizing it in the device.

A further object is to provide a novel construction of device of the foregoing character in which the ellipsoidal form of memory medium provides additional features and advantages such as:

1. the laser beam is moved very rapidly, as by swinging it angularly;
2. the construction and arrangement involves the placement of the laser beam director and sensor in operating locations at respective foci of the ellipsoidal shape, which thereby provides great component stability, and simplicity of design;
3. the construction enables the use of a plurality of laser beams simultaneously in conjunction with a single memory medium;
4. may be used as an encoder of external phenomena, as an optical rotary shaft encoder, amplifying the movements of the laser beams, and magnifying the fluctuation of phenomena being measured.

BRIEF DESCRIPTION OF THE INDIVIDUAL FIGURES OF THE DRAWINGS

FIG. 1 is a perspective view of a device made according to the present invention, FIG. 2 is a semi-diagrammatic view of a prior art device of the same overall nature.

FIG. 3 is a sectional view of the device of FIG. 1.

FIG. 4 is a semi-diagrammatic view looking down on FIG. 3.

FIG. 5 is a semi-diagrammatic view of a translation mirror used in the device.

FIG. 6 is a view similar to FIG. 5 of another form of translation mirror.

FIG. 7 is a view of a third form of translation mirror.

FIG. 7a is a fragmentary view of still another form of translation mirror.

FIG. 7b is a fragmentary view of an additional form of translation mirror.

FIG. 8 is a view similar to FIG. 3 of another form showing a memory medium of toroid-elliptic shape.

FIG. 9 is a semi-diagrammatic view looking down on FIG. 8.

FIG. 10 is a view similar to FIG. 8 but having a single translation mirror.

FIG. 11 is a view similar to FIG. 3 showing another form of device.

FIG. 12 is a view similar to FIG. 3 showing still another form of device.

FIG. 13 is a view similar to FIG. 10 showing another form of device.

FIG. 14 is a semi-diagrammatic perspective view including multiple components of laser beam source, translation mirror, receiving diodes, in conjunction with a single memory medium.

FIG. 15 shows a form of the device having segmented facets on the T-mirror and the memory medium surface.

FIG. 16 is a semi-diagrammatic view of device similar to FIG. 13 but having a lens and a slit for controlling the laser beam.

FIG. 17 shows a memory medium surface having a conical and hemispheric shape.

FIG. 18 is a view similar to FIG. 3 showing the translation mirror spaced from the focus of the memory surface.

FIG. 19 is similar to FIG. 18 but with the translation mirror spaced in the other direction.

DETAILED DESCRIPTION OF THE DRAWINGS

The device of the invention includes a basic concept that is generically of known character, in that it includes a source of laser beam, a memory medium and a sensing diode. In the use of such a device heretofore, the memory medium was in the form of a flat disc rotated on an internal axis and having a spiral track, the track leading from the periphery to a position near the axis of rotation. The laser beam was directed onto the memory medium, and reflected therefrom to a sensor, which translated the beam into an end function. In the initial step in recording on such a device, the laser beam produced or deposited signals on the track and these signals were sensed by the sensor. The laser beam was applied to the track, according to the spiral shape of the latter, the beam following that shape of the track. Then in the later step of reproducing or retrieving the signals from the memory medium, a similar operation was performed, running the laser beam over the track. In devices heretofore, the source of the laser beam was mounted and moved in a radial direction, over the memory medium. The rates of movement of the various components were of course synchronized and coordinated so that the laser beam followed the track according to the shape of the latter.

The laser beam source was so mounted in a mechanical fashion, and moved mechanically by a mover or motor, the overall nature being that the source of the laser beam was in the form of a physically relatively large body that was moved in the direction mentioned.

This mounting and movement of the laser beam source and the application of the laser beam onto the memory medium, was utilized in both recording on the memory medium, and sensing from it, as noted. As will be realized, the track on the memory medium was extremely small, and minute, as was necessary considering the use of the laser beam, and the mechanical or electrical means for moving the laser beam source was necessarily of extremely fine and accurate nature in order to move the laser beam in the small increments required because of the small dimensions of the track.

The device of the present invention includes an arrangement whereby the laser beam source is held in a stationary position, and means, including a translation mirror, is utilized for reflecting the laser beam onto the memory medium in a pattern according to the track on the memory medium. The laser beam is thereupon reflected from the track to the sensor. Such a device is utilized both for applying the signals to the track and for sensing the signals from the track and reproducing them in form that could be appreciated by the user.

Such devices may be of different natures, in the computer field, such as for audio, or for video, and for control devices, etc. The device of the present invention is of the same general nature as previous devices, and therefore a minimum of description of the individual elements making up the device is provided, and instead particular attention is directed to the relationship between those elements, and their functions, individually and conjointly.

Referring to the drawings in detail, attention is directed first to FIG. 1 which shows a memory medium 20, a laser beam source or generator 22, a translation mirror 24 and a sensor 26 having a sensing element 27. The translation mirror may be referred to as a T-mirror for convenience. The device is shown in one selected position, upright in FIG. 1, but it may be arranged in other positions instead, i.e. in the reverse of that shown, or turned sideways, etc.

FIG. 2 shows a typical device of the prior art, which includes a turntable 28, rotatable on a central axis 28', and on which is a disc 29 constituting a memory medium having a spiral track. The laser beam source 22 is mounted on a screw 30, for movement by and along the screw in a direction radially of the disc and directing the laser beam 31 onto the track. A sensor 32 is utilized, mounted on the laser beam source, receiving signals by the laser beam, reflected from the track.

The memory medium 20 in the present device is a circular member mounted on a shaft 33 for rotation on a central axis 34. It is somewhat in the form of a solid block, and is generally saucer-shaped, having a concave memory surface 35, of ellipsoid shape but which may assume various specific forms, as referred to hereinbelow. The memory surface 35 which may also be referred to as a recording surface, is three-dimensional, having an elliptical shape in a diametrical plane that contains the axis 34 (FIG. 3). The memory surface is generated about its own minor axis 36, resulting in its three-dimensional shape. The memory surface 35 has a track 35a (FIG. 4) thereon, of spiral shape, beginning at the periphery, for example, and progressing inwardly, terminating adjacent the central axis of rotation 34. The track is not limited to spiral shape, but alternatively may be of radial shape, or of concentric circles, or of wave form, or of digital or analog form. It will be understood that the elliptical shape as shown in FIG. 3 is only a half of a 3-dimensional ellipse, containing that portion on one side of the major axis 37 of the ellipse. The minor axis 36 of the ellipse coincides with the axis of rotation 34.

In the description herein, the suffix -oid is utilized to express similarity and in this case shapes that include an ellipse as a basis shape. Also, the expression sphere or spherical indicates a shape that is hollow or concave, although being in the nature of an ellipsoid shape.

The ellipse as shown in FIG. 3, lying in the plane of the paper, has foci 38, 39, and these foci enter into the description of the device hereinbelow. The laser beam source 22, as indicated above, is stationarily mounted, such mounting being indicated at 40, and it generates a laser beam 42, the exact nature of which will be referred to again hereinbelow.

The T-mirror 24 is shown in several forms in FIGS. 5, 6, and 7, individually identified 24a, 24b, 24c, all of which are of frusto-conical shape, having a base surface 46 and a top surface 47 parallel with the base surface, and an oblique conical reflecting surface 48. The T-mirrors of these FIGS. (5-7) are shown inverted relative to those of FIGS. 3, 8. Other forms are shown in FIGS. 7a and 7b identified 24d, 24e, arranged for tilting, in contrast to rotating.

Referring first to the form of FIG. 5, the cone 24a has a central axis 50 perpendicular to the base and top surfaces, and is mounted on a shaft 51, the axis 52 of which is coincident with the axis 50. The T-mirror is mounted for rotation on its central axis 52 which is positioned parallel with the axis 34 of the memory medium.

In the T-mirror 24a (FIG. 5) the oblique conical reflecting surface 48 is not axially symmetrical with its central axis 52. It will be seen that this surface on one side, e.g. the left side, 48a, is disposed at a small angle to the axis 52, while at the opposite side the surface, 48b, is disposed at a greater angle to that axis, the surface changing constantly around the mirror, in axial direction. This shape of the T-mirror correlates with the shape of the reflecting surface 35 and the track 35a thereon, as will be referred to again hereinbelow. The axis 52 of the T-mirror is, in this case, parallel with the axis of rotation 50.

The T-mirror 24 and the sensor 26 are associated with the respective foci 38, 39 of the ellipse (FIG. 3). The character of the memory surface 35, and the means and manner of applying the laser beam thereto and producing signals thereon (on a flat disc—FIG. 2), are of known character. The signals themselves may be of different characteristics in the respective devices, and the reflecting surface may be altered in texture or shape, however slightly, as by pits, but the production of such signals does not detract from the identifying shape of the memory surface, i.e. the memory surface may nevertheless be referred to as elliptical or ellipsoid, and any alteration in the shape of the track, to the minor extent referred to, does not change the essence or the nature of the surface 35 as being a smooth elliptical surface. The track formed on the surface 35 is of reflective nature, as will be understood. The T-mirror is so located that the focus 38 lies on the conical surface 48 at some point on the latter. The laser beam 42 includes an original segment 42a, a segment 42b and a segment 42c, the segments 42b and 42c together being referred to as an excursion beam. The reflecting surface 48 is such that the beam segment 42b is so directed that it strikes the surface 35 and is reflected by the latter, and the resulting reflected segment 42c is thereby directed to the focus 39. The sensor 26 has a sensing element 27 which is struck by the reflected beam segment 42c. In accordance with the nature of ellipses, a beam directed from a first focus (38) to the reflecting surface (35) is again reflected to the second focus (39). This relationship holds throughout the action of the reflecting steps so that regardless where on the reflecting surface the beam strikes, it will be reflected to the second focus.

The memory medium, as noted above, is rotated, and the beam segment 42b is directed onto the track thereon. As the memory medium is rotated, and the T-mirror is also and correspondingly rotated, the beam is moved, relatively speaking, along the track. Since the track is of progressive nature, i.e. it is not in a plane surface, the reflected segment must follow a corresponding path, and this is provided by the rotation of the T-mirror and additional movement thereof to maintain the desired point on the T-mirror at the focus 38. This additional movement may be in axial direction as indicated by the arrow 43b (FIG. 5) or radially as indicated by the arrow 43b. Another kind of movement that may be used is tilting as shown in FIGS. 7a and 7b referred to hereinbelow.

As has been noted, the function of the T-mirror in the device is to direct the laser beam segment 42b onto the memory surface by means whereby the point of origin of the laser beam segment 42b is actually or virtually identical with points of elliptical focus. It has also been pointed out that this function exists throughout the full range of the excursion of the laser beam segment 42b. It is to be understood that the reflective surface of the T-mirrors may be operably placed above or below the actual points of elliptical focus and that the points of elliptical focus need not necessarily be coincident with the T-mirror's reflective surface. It is pointed out that the T-mirrors may function when moved or rotated on an axis that is parallel, perpendicular or tangential to the axis of rotation of the memory medium disk. The specific shape of the T-mirror's reflective surface must operably correspond to the placement of the T-mirror and the full range of movement of the T-mirror, as will be understood.

It is pointed out that the laser beam segment 42b strikes the track at points or locations at one side only, i.e. from the periphery, at the left, FIG. 3, down to the center, or axis 34, the beam striking the track throughout the spiral length of the latter, throughout the extent of the memory surface, in response to rotation of the memory medium, it not being necessary to strike it on the opposite side of the rotational axis 34.

The sensor 26 is so positioned and shaped that when the element 27 thereof is at the focus 39, it receives the reflected beam segments 42c regardless of the points on the track from which they are reflected. The element 27 may be of relatively great size and effectively receive the reflected segments regardless of the direction from which they derive, within a certain range.

The T-mirror 24b of FIG. 6 is in itself similar to the T-mirror 24a of FIG. 5. The T-mirror 24b has a central axis 54, but is mounted on a shaft 56 having an axis 58 eccentric to the center of the reflective surface 48 of the cone. This provides a different specific movement to maintain the effective point at the focus.

The T-mirror 24c of FIG. 7 is similar to that of FIG. 5, but has the central axis 59, disposed at an acute angle to the rotational axis 57.

The T-mirror 24d of FIG. 7a is arranged for tilting and includes a mirror element 60 having a reflecting surface 61, and mounted on a fulcrum 62 for tilting. It has an arm 63 attracted by an electromagnet 64 and retracted by a tension spring 65, for producing the tilting action. In this case, that action is of vibratory character. The laser beam segments 42b and 42c are shown, in their relation to the reflecting surface 61.

In the form of T-mirror 24e, of FIG. 7b, the mirror element 60 is biased downwardly by a tension spring 65' while it is moved upwardly by a rotary cam 65". As contrasted with that of FIG. 7a, the present device (FIG. 7b) is continuously variable.

the T-mirror may be flat, or curved, or lens shape, or prism shape, or zone lens shape.

Attention is directed next to the form of the device shown in FIGS. 8 and 9. While the first form referred to above, includes a single ellipsoid shape, the form shown in FIGS. 8 and 9 includes two ellipsoid shapes lying in a diametrical plane, this shape being developed by revolution of the device around an external axis parallel with its minor axis. This ellipsoid shape therefore is generally of one-half donut shape, or toroid shape. In this form, the memory medium 66 is similar to the memory medium 20 in that it has the form of a solid block, and is mounted on a shaft 67 for rotation about a main central axis 68. The memory medium 66 is shown in section, being cut on an axial plane containing the axis 68, presenting to view a face 69 lying in that plane.

The memory medium 66 has a memory surface 70 which has double ellipsoid segments lying in the plane 69, i.e., on opposite sides of a central hub 71. The memory surface 70 continues around the main central axis 68 and thus forms a continuous shape around that axis and constitutes one-half of a donut shape or toroid shape, this one-half being on one side of a plane perpendicular to the main axis 68. It is pointed out that this relationship is approximately one-half, and not necessarily exactly one-half.

Considering that portion of the memory surface lying in the plane 69, in each segment of the memory surface, lying in that plane on opposite sides of the central axis 68, two foci are established. These foci are identified generally at 72 and are individually identified 72a, 72b. The focus 72a may be considered an outer focus, and the focus 72b an inner focus, for convenience in description of the device and the operation thereof, hereinbelow.

The memory medium is symmetrical about the main axis 68, and upon rotation about that axis, any focus 72 may be considered as moving in circles or rings 73 which are of course also symmetrical about the axis 68. The foci 72a move in the outer ring 73a while the foci 72b move in the inner ring 73b. The foci 72 occur throughout the rings, and are considered or identified according to any one position or point of functioning on this latter point, the particular foci are identified, and represented, in the drawings as lying in the plane 69. These foci lying in this plane enter into the functioning of the laser beam, or beams, illustrated, and described below.

The donut or toroid shape accommodates a plurality of laser beams for retrieving signals from the memory track. Two of these beams are shown in FIG. 8, in which those on each of opposite sides of the central axis 68 may be considered related, or making up a set. In this construction, two laser beam sources 74 are shown, individually identified as 74a, 74b. Similarly, two T-mirrors 75 are utilized, individually identified as 75a, 75b; laser beams 76 individually identified as 76A, 76B each of the beams being made up of segments of the same reference numerals accompanied by subscripts a, b, c, as in the case of the device of FIG. 3, In each of the sets of FIG. 8, the laser beam 76, on the right hand side strikes the corresponding T-mirror and the beam is directed by the T-mirror onto the reflective surface of the memory medium and from there reflected onto the corresponding sensor, of that set. A similar function occurs of course on the left hand side.

While FIG. 8 shows two such sets of elements associated with the laser beam, it is possible to use more than two, as represented in FIG. 9. In the latter figure, a third set of such elements 77 may be utilized, and indeed any number of such sets that is found practical may be used.

A great advantage of this arrangement (FIGS. 8, 9) is that a single memory medium may be utilized in conjunction with a plurality of, and in fact a relatively great number of, laser beams. Each of the beams may be utilized for impressing on the memory medium for various purposes. For example, they may be used for either audio or video, or both, for harmonizing sound or producing stereoscopic effects, etc., in the video.

As multiple laser beams are added to the various embodiments of the invention, the surface of the memory medium disk may be scanned by such plurality of laser beams. These scanning laser beams may act together, in a coordinated way, with each other, and with the rotating memory medium. The use of the multiple laser beams thereby enables the finding of the impressed memory tracks 35a (FIG. 4), far more quickly than would be the case if a single laser beam scanned across the entire memory medium surface. It is this fast-acting means for the finding of the impressed memory tracks that comprises one of the extremely desirable features of the invention, as will be understood.

Attention is next directed to FIG. 10. The construction of this figure is similar to that of FIGS. 8 and 9 except that in FIGS. 8 and 9, a plurality of T-mirrors were used. In the present case, the memory medium 60 is utilized, having a similar double ellipsoid memory surface 70. In this case a single T-mirror 94 is utilized, and is rotatable about the main central axis 62. The T-mirror is of frusto-conical shape, and its reflecting surface 96 converges toward the memory medium. A plurality of laser beam sources 98 are utilized, each directing a laser beam 100 onto the T-mirror, which are then directed onto the memory surface and then reflected to the sensors 102. The laser beam sources may be put in any desired position, within a wide range, such as that shown in full lines in which they direct the beams substantially perpendicular to the main axis 62, or at other angular positions shown in dot dash lines. In each case the reflecting surface 96 on the T-mirror is shaped according to the corresponding position of the laser beam source.

FIG. 11 shows another form of device, which includes a memory medium 80 having a memory surface 82 of prolate ellipsoid shape, and rotatable about a main central axis 84 which is coincident with the major axis of the ellipse. In this construction the T-mirror 86 is rotatable on an axis 87 disposed perpendicular to the main axis 84. The T-mirror 86 is of truncated shape, as those described above, and may have a reflecting surface 89 conical in shape, but may be different in detail from the reflective surfaces of the other T-mirrors.

The reflecting surface 82 has foci 88, individually identified 88a, 88b. The T-mirror is so located that the one focus 88a resides on the reflecting surface thereof, and the other focus 88b is in relative position corresponding to the specific shape of the ellipsoid reflecting surface.

A laser beam source 90 is provided which directs a light beam 92, this light beam being reflected by the T-mirror to the reflecting surface 82, and then it is reflected to the other focus 88b. This figure shows laser beams being reflected in two different directions onto the reflecting surface, this also constituting a novel feature. It is pointed out that this construction (FIG. 11) utilizes a single T-mirror, 86, as contrasted with plurality of T-mirrors in construction of FIGS. 8 and 9.

Still another form of the device is shown in FIG. 12. In this case, the memory medium 106 is rotatable about a main central axis 108. The memory medium has a memory surface 110.

In this form, the memory surface 110 is in the shape of a donut or toroid, generated about the main central axis 108 which is external to the ellipsoid surface, and parallel with the major axis of the ellipse.

The construction of FIG. 12 shows a single set of laser beam components, indicated generally at 111, including a stationary laser beam source 112, a T-mirror 114, and sensor 116. A laser beam 117 is generated, striking the T-mirror, and then reflected from the memory surface 110 to the sensor.

In this case, (FIG. 12) a single set of these components is utilized, but a plurality of such sets may be utilized, at different locations around the memory medium. As represented in this figure, the laser beam is reflected at different points on the memory surface, these points being selected in this illustration, for representing different steps in the process. In this case also, each set of laser beam components are related to corresponding foci at any given location around the memory medium. This figure shows one-half of the memory medium, being cut in a diametrical plane, containing the main axis, exposing a cut surface 118 lying in that plane. Rings 119 indicate the location of the respective foci as distributed around the main axis 108.

Still another form of device is shown in FIG. 13. In this case the memory medium 120 has a memory surface 121 made up of two portions 121a, 121b generated about the main central axis 123, about which the memory medium itself is rotated. The two parts of the memory surface, 121a, 121b are of ellipsoid shape, but together are effectively overlapped so that neither is in the form of a half-ellipse, having major axes 124, individually identified 124a, 124b. The portions of the memory surface exposed in FIG. 13, lie in the common plane referred to, and considering the shape of the memory surface lying in that plane, on one side is the focus 126a, and near the main central axis is the focus 126b.

A single T-mirror 128 is rotatably mounted on the axis 123, having a conical reflecting surface 129, converging toward the memory surface. The outer focus 126a lies on this reflecting surface, while the other focus 126b is located within the hollow or spheroid space of the ellipsoid surface, and the sensor 130 is located at the inner focus. This construction is another example of the great flexibility in shape of the device which may be convenient or even necessary in specific locations, to accommodate size, space, etc.

FIG. 14 shows yet another form. This construction includes a memory medium 136, having an ellipsoid memory surface 138 generated about a major axis of rotation 140 which is coincident with the minor axis of the oblate ellipsoid memory surface 138.

This construction differs from the others in that it includes an oblate memory surface generated about an internal axis (140) and is utilizing a plurality of laser beam sets. In the present case there are two such sets, one including a T-mirror 141 and sensor 142, and the other a T-mirror 144 and sensor 145. Those components of each set are arranged diametrically relative to the axis 140, and are positioned near the concentric ring of elliptical foci 149. Separate laser beam sources 147 and 148 are provided corresponding to the sets mentioned. This arrangement also is another example of the wide variety or flexibility of the device for use in different constructions, or for use in connection with various circumstances.

Attention is next directed to FIG. 15. In the previous forms, the T-mirror reflecting surface and memory surface were considered continuous and smooth. However, the device is not limited to that shape, within the broad scope of the invention. This construction (FIG. 15) includes a stationary laser beam source 150, a memory medium 152 rotatable on an axis 153 and having a memory track 154 which may be of spiral shape. A T-mirror 156 is rotatable on an axis 157 and has a conical reflecting surface 158. In the present case the memory track 154 is made up of facets or segments 154a that are discrete and directed mutually at different angles. Similarly, the conical reflecting surface 158 is made up of discrete facets or segments 158a. These facets 154a, 158a may individually have planar reflective shapes.

The memory medium surface is radially symmetric about the main central axis of rotation 153 and has a diametric cross section of elliptical or toric-elliptical shape. It is pointed out in FIG. 15 that the memory medium surface 152 may depart from a smooth elliptical shape, by having a faceted surface 154a.

Shown in FIG. 17 is a memory medium surface 186 having an outer planar reflective surface, that upon axial revolution, describes the frustum of a right cone. This same memory medium surface 186, also has an inner circular reflective surface, that upon axial revolution, describes a hemisphere. In the present case the memory medium surface has an outer conical section and an inner spherical section. However it is understood that cylindrical or planar or arcuate surfaces may be used as well, and that such surfaces may be smooth or may have any number of facets. The shape of the memory medium surface may differ from a true elliptical shape and still reflect the laser beam segment 42c to a receiving sensor 26' within a definable range. The sensor may have a relatively large size and may also have an elongated shape, designed to operably receive the resulting locus of points of focus.

Another important feature of the invention is the control of the laser beam by lens and slit means. Such a device is shown in FIG. 16, which includes an memory medium 162 rotatable on a central axis 163 by a motor 164, and having an ellipsoid memory surface 165. The T-mirror is shown at 166 being rotated by a motor 167 on an axis 168 coincident with axis 163, in this case. The foci of the memory surface are indicated respectively at 170 on the T-mirror, and 171 at which a sensor 172 is positioned. A stationary laser beam source or diode 174 generates a laser beam 175, which is directed through a collimator lens 176, and a focusing lens 178. A scrim 179 is provided with a slit 180 and positioned at the memory surface, the laser beam passing through the slit.

By the foregoing arrangement, the laser beam is confined against spreading and controlled in direction, within fine and controlled limits.

This construction includes various controls 182 interacting and acting with the components referred to above, for performing a wide range of functions in digital control operations.

FIGS. 18 and 19 show arrangements wherein the T-mirror 24 is positioned relative to the virtual focus of the memory surface. The virtual focus 190 is axially outwardly of the T-mirror in FIG. 18 while the virtual focus 192 is positioned axially inwardly thereof in FIG. 19. In each case, the laser beam rays 42b are reflected onto the memory mirror surface, but in a pattern radiating from the virtual foci The receiving foci 190', 192' and the memory medium 20 of FIG. 18 and FIG. 19 would of course function as has been previously described.

I claim:

1. A digital recorder/retriever device comprising,
   a memory medium rotatable on an internal main axis, and having a concave essentially ellipsoid memory surface surrounding said main axis with a first focus and a second focus,
   the memory surface having a memory track thereon surrounding said main axis, capable of receiving and recording signals thereon from a digital laser beam, and the signals then being capable of being sensed,
   means for directing a laser beam from the first focus onto the track,
   the track being operable for reflecting the laser beam from the first focus to the second focus, and
   means for sensing the signals at the second focus that are reflected thereto from the track.

2. A device according to claim 1 wherein, the ellipsoid memory surface is less than one-half of a 3-dimensional surface on one side of a plane perpendicular to the main axis.

3. A device according to claim 1 wherein,
   the memory surface defines two sets of correlated foci in a plane containing the main axis on any radius from the main axis, and
   a plurality of sets of laser beam instruments and those of each set being operably related to respective ones in a set of correlated foci.

4. A device according to claim 1 and including,
   a single T-mirror for directing laser beams onto the track, the T-mirror having points coincident with a plurality of mutually non-correlated first foci, and
   a plurality of laser beam sensors operable positioned at second foci respectively correlated with said first foci at the T-mirror.

5. A device according to claim 1 wherein,
   the ellipsoid memory surface is of prolate shape.

6. A device according to claim 1 wherein,
   the ellipsoid memory surface is of oblate shape.

7. A device according to claim 1 wherein,
   the means for directing the laser beam is a circular T-mirror rotatable on said main axis,
   the device contains a single such T-mirror having reflecting points operably positioned at respective ellipse foci, and
   the device contains a plurality of laser beam sensors distributed in a circle around said main axis and operably positioned at respective foci correlated with the foci at the T-mirror.

8. A device according to claim 1 wherein, the rotating memory surface is of toroid shape, a torus generated by the revolution of an ellipse of a circle, about an axis lying in a diametrical plane.

9. A device according to claim 1 wherein,
the memory surface is made up of discrete facets of planar shape directed mutually at different angles.

10. A device according to claim 1 wherein,
the ellipsoid memory surface is essentially one-half of a 3-dimensionable surface on one side of a plane perpendicular to the main axis, and said track is of spiral, or radial, shape, or of concentric circles, or of wave form, or of digital or analog form.

11. A device according to claim 10 wherein,
the memory surface is of an ellipsoidal surface generated by revolution about the major axis of a basic ellipse.

12. A device according to claim 10 wherein,
the memory surface is of hemispheric ellipsoidal shape generated by revolution about the minor axis of a basic ellipse.

13. A device according to claim 1 wherein,
the ellipsoid memory surface is a 3-dimensional toroidal surface generated around an axis external to the memory surface.

14. A device according to claim 13 wherein,
said external axis is parallel with said main axis.

15. A device according to claim 13 wherein,
the memory surface establishes correlated foci on each of diametrically opposite sides of the main axis in a common plane with the main axis on any radius from the main axis.

16. A device according to claim 1 wherein,
the means for directing the laser beam includes a T-mirror having a movable reflecting surface.

17. A device according to claim 16 wherein,
the T-mirror has a reflecting surface composed of a plurality of planar facets.

18. A device according to claim 16 wherein,
the T-mirror is one of, pivoted, rotatable, sliding, and it is one of flat, curved, lens shape, prism shape, zone lens shape.

19. A device according to claim 16 wherein, the T-mirror is operably placed and shaped so as to direct laser beams in such a way that the point of origin of the laser beams is effectively identical with virtual points of elliptical focus.

20. A device according to claim 16 wherein, the T-mirror is operably placed and shaped so as to direct laser beams to pass through virtual points of elliptical focus.

21. A device according to claim 16 wherein,
the T-mirror is rotatable and the reflecting surface thereof is of conical shape.

22. A device according to claim 21 wherein, the T-mirror is rotatable on an axis parallel with said main axis.

23. A device according to claim 22 wherein,
the T-mirror is also movable in tilting direction.

24. A device according to claim 22 wherein,
the T-mirror is also movable translationally.

25. A device according to claim 21 wherein, the T-mirror is rotatable on an axis perpendicular with said main axis.

26. A device according to claim 21 wherein, the T-mirror is rotatable on an axis disposed at a tangent with said main axis.

27. A digital recorder/retriever device comprising,
a memory medium rotatable on an internal main axis, and having a concave memory surface surrounding said main axis with a first focus and a second focus,
the memory surface having a memory track thereon surrounding said main axis, capable of receiving and recording signals thereon from a digital laser beam, and the signals then being capable of being sensed,
means for directing a laser beam from the first focus onto the track,
the track being operable for reflecting the laser beam from the first focus to the second focus, and
means for sensing the signals at the second focus that are reflected thereto from the track, the memory medium surface is one of concave shape, cylindrical shape, planar shape, conical shape, curved shape, having planar facets, radially concentric combination of any of the foregoing shapes.

* * * * *